United States Patent [19]

Geisler et al.

[11] Patent Number: 4,563,904

[45] Date of Patent: Jan. 14, 1986

[54] EXCITATION CIRCUIT FOR ELECTROMAGNETIC FLOWMETER

[75] Inventors: Gottfried Geisler; Jörg-Ulrich Breithaupt, both of Goettingen, Fed. Rep. of Germany

[73] Assignee: Fischer & Porter Company, Warminster, Pa.

[21] Appl. No.: 649,656

[22] Filed: Sep. 12, 1984

[51] Int. Cl.⁴ .............................................. G01F 1/60
[52] U.S. Cl. .................................. 73/861.12; 361/152
[58] Field of Search ............ 73/861.12, 861.16, 861.17; 361/152, 153, 154

[56] References Cited

U.S. PATENT DOCUMENTS

| | | | |
|---|---|---|---|
| 3,996,797 | 12/1976 | Torimaru et al. | 73/861.16 |
| 4,373,400 | 2/1983 | Sekiguchi | 73/861.12 |
| 4,462,060 | 7/1984 | Schmoock | 73/861.17 |
| 4,488,438 | 12/1984 | Tomita | 73/861.12 |

*Primary Examiner*—Herbert Goldstein
*Attorney, Agent, or Firm*—Michael Ebert

[57] ABSTRACT

An electromagnetic flowmeter provided with a field coil to create a magnetic field across the flow tube through which the fluid to be metered is conducted, the flowmeter having an excitation circuit adapted to supply periodic current to the coil in alternating polarity and to maintain the intensity of the current at a constant level. The circuit includes a polarity-reversing commutator whose input is connected to a current supply source through an actuatable switch, and whose output is connected through a cable to the coil. The switch is actuated by a switching regulator generating actuating pulses whose duty cycle is modulated in accordance with an applied control signal. A reference signal is derived from the field coil that is proportional to varying current flow therethrough and is compared with a set point to produce a control signal that depends on the difference therebetween. This control signal is applied to the switching regulator to modulate its pulse duty cycle and thereby so actuate the switch as to maintain the intensity of current supplied to the coil at a substantially constant level.

7 Claims, 1 Drawing Figure

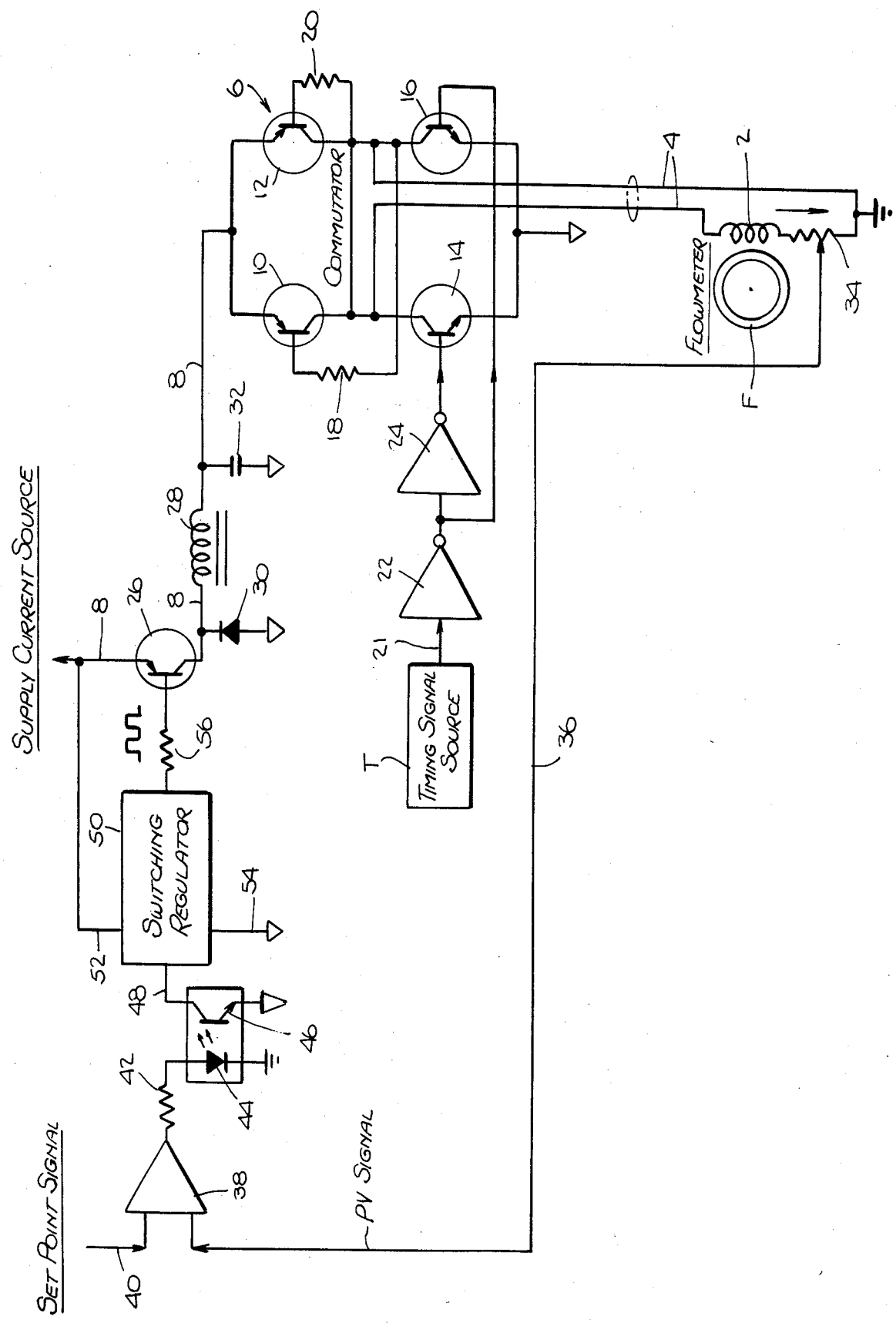

EXCITATION CIRCUIT FOR ELECTROMAGNETIC FLOWMETER

BACKGROUND OF INVENTION

1. Field of Invention

This invention relates generally to electromagnetic flowmeters, and more particularly to an excitation circuit for supplying periodic current to the field coil of the flowmeter in alternating polarity and to maintain the intensity of the current at a constant level regardless of fluctuations in the supply current source or of other changes which would otherwise affect the intensity level.

2. Prior Art

In an electromagnetic flowmeter such as those disclosed in the Mannherz Pat. No. 4,296,636 and in the Schmoock et al. Pat. No. 4,417,479, the fluid whose flow rate is to be measured is conducted through a flow tube provided with a pair of diametrically-opposed electrodes, a magnetic field perpendicular to the flow axis being created by an electromagnet formed by a pair of opposed field coils. When the flowing fluid intersects this field, a voltage is induced therein which is transferred to the electrodes. This voltage, which is proportional to the volumetric flow rate, is then amplified and processed in a converter or secondary to provide a flow rate indication.

The magnetic field may either be direct or alternating; for, in either event, the amplitude of voltage induced in the fluid intersecting the field will be a function of flow rate. However, when operating with a direct magnetic flux, the resultant d-c signal current flowing through the fluid acts to polarize the electrodes, the magnitude of polarization being proportional to the time integral of the polarization current. By alternating the polarity of current applied to the field coils and thereby alternating the resultant field, polarization is rendered negligible, for the resultant signal current and therefore its integral does not build up with time.

In one known electromagnetic flowmeter of this type, current from a supply is fed into the excitation circuit through an extended cable, the circuit including a commutator which acts periodically to reverse the polarity of the current fed to the field coil (or coils). The intensity of the current which flows through the field coil therefore diminishes to an extent depending on the length of the cable. This gives rise to errors in measurement unless the length of the supply cable is taken into account in each installation.

Moreover, fluctuations in the supply current source for the excitation circuit act to vary the intensity of current flowing through the coil. Also, changes in the parameters of the field coil as a result of temperature variations act to vary the intensity of the coil current.

SUMMARY OF INVENTION

In view of the foregoing, the main object of this invention is to provide an improved excitation circuit for an electromagnetic flowmeter to supply periodic current to the field coil thereof of alternating polarity and to maintain the intensity of the current constant, regardless of the length of the field cable or other factors which affect the intensity of the current.

More particularly, it is an object of this invention to provide an excitation circuit of the above type which includes a commutator whose output is coupled by way of a field cable to the field coil.

A significant feature of the invention is that there are no electronic switching components interposed between the field cable and the field coil which can generate current peaks, transients or surges, for the switching regulator and commutator are located at the input end of the cable, not at the output end thereof.

Briefly stated, these objects are attained in an electromagnetic flowmeter in which a field coil creates a magnetic field across the flow tube through which the fluid to be metered is conducted, the flowmeter having an excitation circuit adapted to supply periodic current to the coil in alternating polarity and to maintain the intensity of the current at a constant level.

The circuit includes a polarity-reversing commutator whose input is connected to an unregulated direct current supply source through an actuatable electronic switch, and whose output is connected through a cable to the coil.

The switch is actuated by a switching regulator generating actuating pulses whose duty cycle is modulated in accordance with an applied control signal. A reference signal is derived from the field coil that is proportional to varying current flow therethrough and is compared with a set point to produce a control signal that depends on the difference therebetween. This control signal is applied to the switching regulator to modulate its pulse duty cycle and thereby so actuate the switch as to maintain the intensity of current supplied to the coil at a substantially constant level.

OUTLINE OF DRAWING

For a better understanding of the invention as well as other objects and further features thereof, reference is made to the drawing whose single figure discloses an excitation circuit in accordance with the invention.

DESCRIPTION OF INVENTION

Referring now to the drawing, there is shown an electromagnetic flowmeter generally designated F whose field coil 2 is excited to generate an alternating magnetic field. To this end, field coil 2 is supplied with current via a two-wire cable 4 from the output of a polarity-reversing commutator, generally designated by numeral 6, included in an excitation circuit in accordance with the invention.

Commutator 6 is composed of four transistors 10, 12, 14 and 16 in a bridge arrangement. A resistor 18 is connected between the base of transistor 10 and the interconnected collectors of transistors 12 and 16, while a resistor 20 is connected between the base of transistor 12 and the interconnected collectors of transistors 10 and 14. The input to commutator 6 is supplied with current relative to ground via a conductor 8 through a switching transistor 26 coupled to an unregulated rectified supply current source.

A timing signal source T is connected through conductor 21 to a first inverter 22 whose output is applied to the base of transistor 16. The output of inverter 22 is also connected to a second inverter 24 whose output is applied to the base of transistor 14. Thus, applied to the respective bases of transistors 14 and 16 are timing signals of opposite polarity whereby the current supplied by the commutator transistors to field coil 22 via cable 4 alternates in polarity at a fixed rate determined by the timing signals.

Interposed in line 8 between the collector of switching transistor 26 and the input end of commutator 6 is an impedance coil 28. A diode 30 is connected between the junction of coil 28 and transistor 26 to ground. A capacitor 32 is connected between the other side of the coil to ground. Impedance coil 28 and capacitor 32 together form a smoothing filter which acts to dampen the peaks or transients of current resulting from the rapid switching action. Hence, applied to the input end of commutator 6 is a relatively clean, peak-free unidirectional current.

Connected in series with field coil 2 is a reference resistor 34 across which a reference signal is developed which reflects the varying current flow through the field coil. This reference signal is applied as a process variable through line 36 to one input of a comparator 38 to whose other input is applied via line 40 a set point signal.

Thus, yielded in the output of comparator 38 is a signal representing the deviation of the process variable from the set point. This is applied through a resistor 42 to the LED 44 of an electro-optical isolator which also includes a photocell 46 responsive to the emitted light.

Thus, developed across resistor 42 is an error signal reflecting the deviation to cause LED 44 to emit more or less light and thereby modulate the amplitude of the signal yielded by photocell 46. The signal from photocell 46 is applied as a control signal to the input of switching regulator 50 which is supplied with power from the current supply source via line 52, the regulator being grounded via line 54. The regulator generates actuating pulses of variable duty cycle.

The output of regulator 50 is connected through a resistor 56 to the base of switching transistor 26. The pulse duty cycle of the regulator is modulated in accordance with the magnitude of the control signal applied to its input, which in turn depends on the deviation of the process variable (the intensity of current through the field coil) relative to the set point.

The duty cycle preferably takes the form of pulses of constant repetition rate and varying width depending on the applied control signal. Alternatively, the pulses generated by the regulator to actuate the switching transistor may be of constant width and of varying repetition rate depending on the applied control voltage.

The isolator constituted by LED 44 and photocell 46 galvanically separates switching regulator 50 from comparator 38; hence, regardless of the direction of field coil current, the output of the photocell depends solely on the intensity of field coil current and is independent of the direction of this current.

The variable duty cycle pulses from regulator 50 causes corresponding actuation of switching transistor 26. Because of diode 30 in the output of switching transistor 26, the pulses on line 8 from the output of the diode are monopolar. These monopolar pulses are converted into direct current by the filter constituted by impedance coil 28 and condenser 32.

Commutator 6 periodically acts to alternate the polarity of the direct voltage applied through cable 4 to the field coil 2. When a deviation occurs between the current flowing in the field coil and the set point signal, comparator 38 then functions through the isolator to provide a control signal to the input of switching regulator 50 to change the pulse duty cycle to correct for this deviation and maintain a constant intensity of current through the field coil, regardless of fluctuations in the unregulated current supply or any other factors tending to vary this intensity.

While there has been shown and described a preferred embodiment of an excitation circuit for electromagnetic flowmeter in accordance with the invention, it will be appreciated that many changes and modifications may be made therein without, however, departing from the essential spirit thereof.

We claim:

1. An electromagnetic flowmeter provided with at least one field coil to establish an alternating magnetic field across a flow tube through which flows the fluid to be metered, and an excitation circuit for supplying current to said coil periodically of alternating polarity, and for maintaining the intensity of this current at a constant level, said circuit comprising:
A. a polarity-reversing commutator whose input is connected to a direct current source and whose output is connected through a cable to said coil to periodically supply current thereto of alternating polarity;
B. an actuatable switch interposed between said source and the input of the commutator;
C. a switching regulator coupled to said switch to actuate same, said regulator generating actuating pulses whose duty cycle depends on the magnitude of a control signal applied to the regulator;
D. means including a comparator for comparing a variable signal derived from the field coil proportional to the current flow therethrough with a set point to produce a control signal whose magnitude depends on the deviation of the variable signal from the set point; and
E. means to apply said control signal to the regulator to so vary the actuating pulse duty cycle as to maintain the intensity of the current flowing in the coil at a constant level.

2. A flowmeter as set forth in claim 1, further including a smoothing filter interposed between the switch and the commutator to dampen the pulsatory output of the switch whereby applied to the input of the commutator is a relatively smooth direct current.

3. A flowmeter as set forth in claim 1, wherein said regulator produces actuating pulses of constant repetition rate and a pulse width which varies in accordance with said control signal.

4. A flowmeter as set forth in claim 1, wherein said switching regulator produces actuating pulses of constant width whose repetition rate varies in accordance with said control signal.

5. A flowmeter as set forth in claim 1, further including an electro-optic isolator coupling the output of the comparator to said switching regulator.

6. A flowmeter as set forth in claim 1, further including means to apply timing signals to said commutator to cause it to apply periodic current to said coil in alternating polarity at a constant rate.

7. A flowmeter as set forth in claim 1, wherein said current source is unregulated and said coil current is maintained at a constant level despite fluctuations in the source.

* * * * *